US007551384B1

(12) United States Patent
McFadyen et al.

(10) Patent No.: US 7,551,384 B1
(45) Date of Patent: Jun. 23, 2009

(54) SYSTEMS AND METHODS FOR CALIBRATING A READ/WRITE CHANNEL OF A HARD DISK DRIVE

(75) Inventors: Jim McFadyen, Redwood City, CA (US); Jim Fitzpatrick, Sudbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 407 days.

(21) Appl. No.: 11/546,001

(22) Filed: Oct. 10, 2006

Related U.S. Application Data

(60) Provisional application No. 60/725,037, filed on Oct. 7, 2005.

(51) Int. Cl.
*G11B 5/02* (2006.01)
(52) U.S. Cl. .............................. 360/67; 360/46; 360/65; 360/75
(58) Field of Classification Search ........................ None
See application file for complete search history.

(56) References Cited

U.S. PATENT DOCUMENTS 5,084,791 A * 1/1992 Thanos et al. ............ 360/77.04
5,838,514 A * 11/1998 Smith et al. .................... 360/75
6,452,735 B1 * 9/2002 Egan et al. ..................... 360/31
6,678,102 B1 * 1/2004 Liikanen et al. ............... 360/31
7,023,647 B2 * 4/2006 Bloodworth et al. .......... 360/75
7,518,813 B1 * 4/2009 Egan et al. ..................... 360/25

* cited by examiner

*Primary Examiner*—Jason C Olson
(74) *Attorney, Agent, or Firm*—Myers Bigel Sibley & Sajovec, P.A.

(57) ABSTRACT

A read/write channel for a hard disk drive comprising at least one analog read component and a fly height control system. The fly height control system controls fly height based on a current fly height value generated based on a fly height measurement signal that passes through the at least one analog read component. The read/write channel comprises a calibration signal generator and a processor. The calibration signal generator generates a calibration signal that is coupled to the at least analog read component to place the read/write channel in a calibration mode. The processor generates compensation data based on an output of the at least one analog read component when the read/write channel is in the calibration mode. The processor generates the current fly height value based on the fly height measurement signal and the compensation data when the read/write channel is in a fly height measurement mode.

34 Claims, 3 Drawing Sheets

SYSTEMS AND METHODS FOR CALIBRATING A READ/WRITE CHANNEL OF A HARD DISK DRIVE

RELATED APPLICATIONS

Priority is claimed from U.S. Provisional Patent Application Ser. No. 60/725,037 filed on Oct. 7, 2005, which is incorporated by reference in its entirety.

FIELD OF THE INVENTION

The present invention relates to hard disk drives and, more particularly, to hard disk drives employing systems and methods for controlling fly height based on a measurement of a current fly height value.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional hard disk drive (HDD) system, generally designated 10, is illustrated in FIG. 1. The HDD system 10 comprises a data storage disk 12 that is rotated by a spindle motor 14. The spindle motor 14 is mounted to a base plate 16.

The HDD system 10 also includes a drive arm assembly 18, which includes a transducer 20 mounted to a flexure arm 22. As is conventional, the transducer 20 comprises both a write head and a read head. The drive arm assembly 18 is attached to an actuator arm 24 that can rotate about a bearing assembly 26. A drive voice coil motor (VCM) 28 cooperates with the actuator arm 24 and, hence, the drive arm assembly 18, to move the transducer 20 relative to the disk 12.

The spindle motor 14, voice coil motor 28, and transducer 20 are coupled to a number of electronic circuits 30. As will be described in further detail below, the electronic circuits 30 typically include a read channel chip, a microprocessor-based controller, a random access memory (RAM) device, and associated signal drive and logic circuitry.

The disk drive system 10 typically includes a plurality of disks 12 and, therefore, a plurality of corresponding actuator arm assemblies 18. However, it is also possible for the disk drive system 10 to include a single disk 12 as shown in FIG. 1. Typically, one drive arm assembly 18 is provided for each surface of each disk 12.

FIG. 2 is a functional block diagram which illustrates a conventional disk drive such as that depicted at 10 in FIG. 1. The example hard disk drive system 10 is coupled to a host device 32 via an input/output 34. The host device 32 may take many forms, including a general purpose computing device, a media player, a cellular telephone, and a digital camera or camcorder.

Data is transferred between the hard disk drive system 10 and a processor of the host device 32 through the input/output port 34. The details of construction and operation of the host device 32 and the input/output port 34 is or may be conventional and will not be described herein beyond the extent necessary for a complete understanding of the present invention.

In addition to the components of the disk drive system 10 shown and labeled in FIG. 1, FIG. 2 illustrates (in block diagram form) that the electronic circuits 30 comprise a drive controller 50, a read/write channel 52, and an interface 54. Conventionally, the drive controller 50 comprises a servo compensator (not shown in FIG. 2). Except as noted below, the details of construction and operation of the drive controller 50, the read/write channel 52, and the interface 54 also are or may be conventional and will not be described herein in further detail.

The disk drive system 10 is used by the host device 32 as a data storage device. The host device 32 delivers data access requests to the disk drive system 10 via the input/output port 34. The data port 34 is used to transfer data between the disk drive system 10 and the host device 32 during read and write operations.

The drive arm assembly 18 is a semi-rigid member that acts as a support structure for the transducer 20, holding it above the surface of the disk 12. The drive arm assembly 18 is coupled at one end to the transducer 20 and at another end to the drive VCM 28. The drive VCM 28 is operative for imparting controlled motion to the actuator arm 18 to appropriately position the transducer 20 with respect to the disk 12. The drive VCM 28 operates in response to a control signal generated by the drive controller 50. The control signal is generated in response to, among other things, an access command received from the host device 32 via the interface 54.

The read/write channel 52 is operative for appropriately processing the data being read from/written to the disk 12. For example, during a read operation, the read/write channel 52 converts an analog read signal generated by the transducer 20 into a digital data signal that can be recognized by the drive controller 50. The channel 52 is also generally capable of recovering timing information from the analog read signal.

During a write operation, the read/write channel 52 converts data received from the host device 32 into a write signal that is delivered to the transducer 20 to "write" the data to an appropriate portion of the disk 12. The read/write channel 52 is also operative for continually processing data read from servo information stored on the disk 12 and delivering the processed data to the drive controller 50 for use in, for example, transducer positioning.

Referring now more specifically to the hard disk 12, as depicted in FIG. 2 the spindle motor 14 is operatively connected to the disk 12 such that the motor 14 rotates the disk 12 relative to the transducer 20. As the spindle motor 14 rotates the disk 12, the transducer 20 stores data on the disk 12 in substantially concentric data storage tracks 60 on a surface 62 of the disk 12. The example data storage disk 12 also includes servo information in the form of a plurality of radially-aligned servo spokes 64 that each cross all of the tracks 60 on the disk 12. The portions of the track between the servo spokes 64 have traditionally been used to store data received from, for example, the host device 32 and are thus referred to herein as data regions 66.

In a magnetic disk drive system 10, data is stored, for example, in the form of magnetic polarity transitions within each track 60. Data is "read" from the disk 12 by positioning the transducer 20 (i.e., the read head) above a desired track 60 of the disk 12 and sensing the magnetic polarity transitions stored within the track 60 as the disk 12 moves below the transducer 20. Similarly, data is "written" to the disk 12 by positioning the transducer 20 (i.e., the write head) above a desired track 60 and delivering a write current representative of the desired data to the transducer 20 at an appropriate time.

The data storage tracks 60 are illustrated as center lines on the surface of the disk 12; however, it should be understood that the actual tracks will each occupy a finite width about a corresponding centerline. It should be understood that, for ease of illustration, only a small number of tracks 60 and servo spokes 64 have been shown on the surface of the disk 12 of FIG. 3. That is, conventional disk drives include one or more disk surfaces having a considerably larger number of tracks and servo spokes.

The servo information in the servo spokes 64 is a specialized form of data stored on the disk 12 that is read by the transducer 20 during disk drive operation for use in positioning the transducer 20 above a desired track 60 of the disk 12. In particular, the disk drive system 10 operates in at least two positioning modes: seek and track following. During the seek mode, the system 10 moves the transducer 20 from an initial track 60a to a target track 60b. During the track following mode, the system 10 maintains the transducer 20 above the desired track 60 while data is read from or written to the disk 12.

The servo information is configured to allow the system 10 to operate in both the seek and track following modes. As is well-known in the art, the servo information stored in the servo spokes allows a servo compensator within the controller 50 to determine a position of the transducer 20 relative to the disk 12. As is conventional, the servo compensator uses the position information during seek and track following modes to move to and/or follow the target track 60b.

FIG. 2 further shows that the read/write channel 52 comprises a preamplifier circuit 70 and a channel circuit 72. The preamplifier circuit 70 generates the write signal for driving the write head portion of the transducer 20 based on an analog differential drive signal generated by the channel circuit 72. The preamplifier circuit 70 generates an analog playback signal based on a read signal generated by the read head portion of the transducer 20. The playback signal is delivered to the channel circuit 72.

The channel circuit 72 generates the analog differential drive signal based on the digital data to be written to the disk 12. The channel circuit 72 converts the analog playback signal into digital data that can be processed by the drive controller 50 and/or host device 32. The details of construction and operation of the preamplifier circuit 70 and the channel circuit 72 are or may be conventional and will not be described herein in further detail.

A spacing distance between the transducer 20 and the surface 62 of the disk 12 is commonly referred to as "fly height." The concept of fly height is depicted in FIG. 3, which illustrates in solid lines a position of the transducer 20 at a first example fly height $h_1$ relative to a disk surface and in broken lines a position of the transducer 20 at a second example fly height $h_2$. The second example fly height $h_2$ is less than the first example fly height $h_1$.

As shown in FIG. 3, the transducer 20 comprises a read element 80 and a write element 82 mounted on a head structure 84. The fly height typically varies during normal operation of the disk drive 10. In general, the fly height should be kept at a minimum without allowing the head structure 84 to come into contact with the disk surface 62.

Passive and active systems are employed to control fly height. In particular, FIG. 3 illustrates a component 90 of the head structure 84 commonly referred to as a slider. The slider 90 is a passive component that is aerodynamically designed to create a force on the head structure 84 away from the disk surface 62 when the disk 12 is rotating.

FIG. 3 further illustrates a fly height control driver 92 that applies a fly height control signal to the head structure 84. The head structure 84 comprises a thermal expansion element that expands or contracts under control of the fly height control signal to raise or lower the transducer 20 relative to the head structure 84. By changing a position of the transducer 20 relative to the head structure 84, a distance between the head transducer 20 and the disk surface 62 can be controlled. The fly height control driver 92 operates as part of a fly height control system 94 further comprising the preamplifier circuit 70, the read/write channel circuit 72, and the controller 50.

The construction and operation of the fly height control driver 92 and the head structure 84 is or may be conventional. The construction of the fly height control circuit 94 will be described herein to that extent necessary for a complete understanding of the present invention.

The fly height control circuit 94 causes the fly height control driver 92 to generate the fly height control signal based on the measured spacing between the read element 80 and the disk surface 62. The spacing between the read element 80 and the disk surface 62 can be measured from the read signal generated by the read element 80 under certain conditions. In particular, the read element 80 is arranged adjacent to tracks prewritten with patterns having a suitable harmonic content. The channel circuit 72 generates the current fly height value based on the output of the read element 80 when it passes over these prewritten tracks.

The current fly height value measured as described above is transmitted to the controller 50, which controls the fly height control driver 92 to generate a fly height control signal to eliminate error between the current fly height value and a desired fly height value representative of the preferred spacing between the transducer 20 and a magnetic layer in the disk 12.

Current methods of generating a current fly height value require precise determination of a ratio of the magnitude of harmonics in an "off disk" fly height measurement signal. The applicants have recognized that the accuracy of the measurement of this ratio is highly susceptible to any changes in frequency response in the analog circuitry within the preamplifier circuit 70 and the channel circuit 72.

More specifically, FIG. 4 illustrates the details of an example preamplifier circuit 70 and an example channel circuit 72. The example preamplifier circuit 70 comprises a read first stage amplifier 120, a read second stage amplifier 122, and a write drive circuit 124. The example channel circuit 72 comprises a channel digital signal processor (DSP) 130 and a read portion 132 and a write portion 134. The read portion 132 includes an analog front end (AFE) circuit 140, an analog to digital (A/D) converter 142, and a decode circuit 144. The write portion 134 comprises an encode circuit 150, a serializing circuit 152, and a write precompensator 154.

The inventors have recognized that the analog components within the preamplifier circuit 70 and channel circuit 72 are capable of introducing errors into the calculation of the current fly height value. These analog components include the read second stage amplifier 122 and the analog front end circuit 140 and will be referred to herein as "analog read components."

In particular, the read element 80 generates the fly height measurement signal while reading tracks prewritten with patterns having a predetermined harmonic content. The read/write channel circuit 72 processes the fly height measurement signal based on ratios of the harmonic content of this signal to determine the current fly height value.

The frequency responses of analog read components, including the read second stage amplifier 122 and the AFE 140, are particularly susceptible to changes based on environmental and implementation factors such as temperature differences and differences in component specifications. Changes in these frequency responses can introduce errors in the fly height control signal that adversely affect the calculation of the current fly height value.

The errors introduced by the analog components of the preamplifier circuit 70 and read/write channel circuit 72 can be significant. For example, bench data suggests that the error incurred by variations in frequency response of the channel AFE 140 alone due to die temperature changes can be as much as approximately 1 nm pole tip protrusion (ptp). Given that the nominal clearance between the head structure 84 and the disk 12 is targeted for 3 nm, the error introduced by the channel AFE 140 can be approximately 30% of the nominal clearance.

The need thus exists for systems and methods for generating current fly height value that are less susceptible to changes in environmental and implementation factors.

SUMMARY OF THE INVENTION

The present invention may be embodied as a read/write channel for a hard disk drive comprising at least one analog read component and a fly height control system. The fly height control system controls fly height based on a current fly height value generated based on a fly height measurement signal that passes through the at least one analog read component. The read/write channel comprises a calibration signal generator and a processor. The calibration signal generator generates a calibration signal that is coupled to the at least one analog read component to place the read/write channel in a calibration mode. The processor generates compensation data based on an output of the at least one analog read component when the read/write channel is in the calibration mode. The processor generates the current fly height value based on the fly height measurement signal and the compensation data when the read/write channel is in a fly height measurement mode.

The present invention may also be embodied as a method of generating a current fly height value for a hard disk drive comprising at least one analog read component and a fly height control system. The fly height control system controls fly height based on the current fly height value generated based on a fly height measurement signal that passes through the at least one analog read component. The method comprises the following steps. A calibration signal is coupled to the at least one analog read component in a calibration mode. Compensation data is generated based on an output of the at least one analog read component in the calibration mode. The current fly height value is generated based on the fly height measurement signal and the compensation data in a fly height measurement mode.

DETAILED DESCRIPTION

Figure 1:
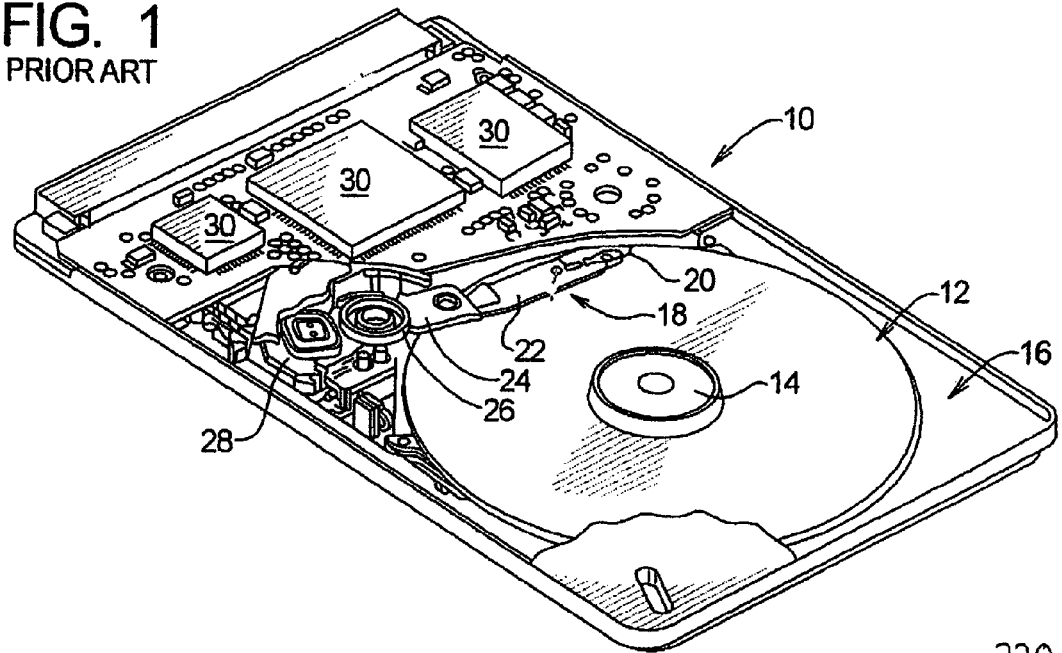
FIG. 1 is a perspective view of a conventional hard disk drive system.
Figure 5:
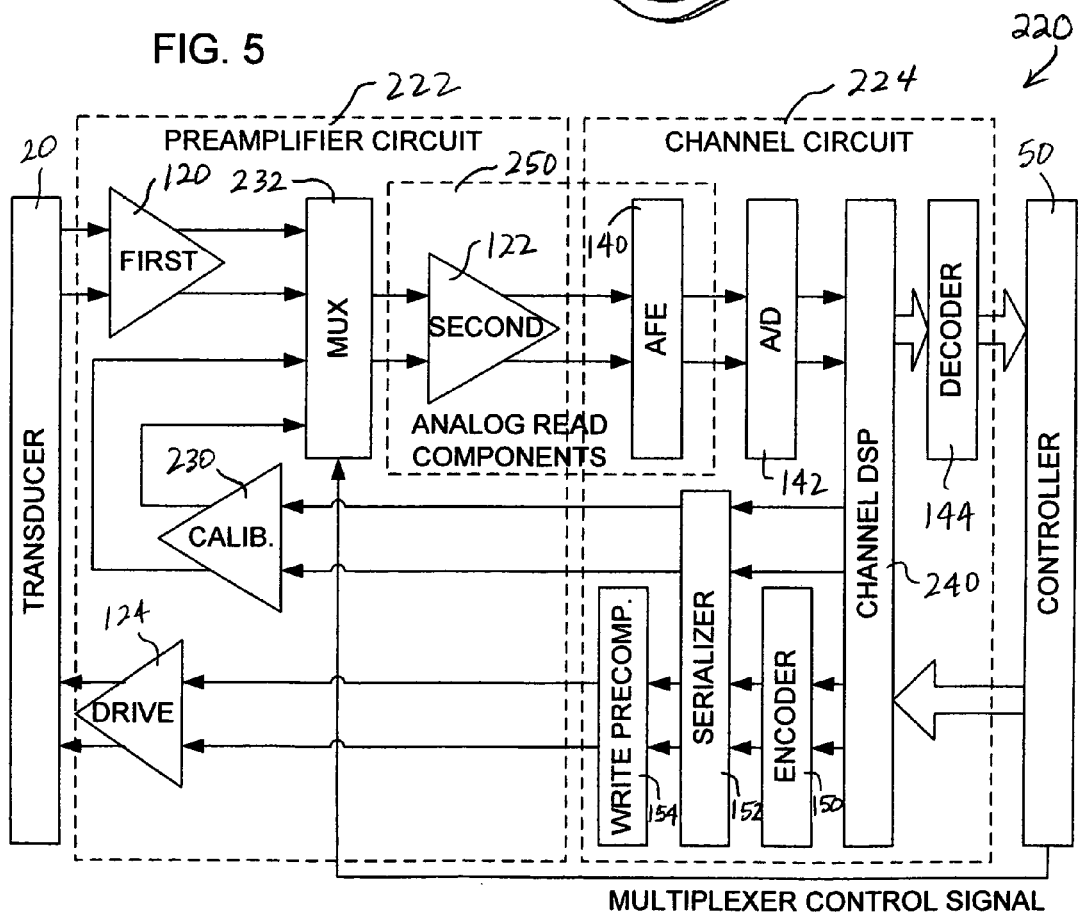
FIG. 5 is simplified block diagram of a fly height calibration system constructed in accordance with, and embodying, the principles of the present invention.
Figure 2:
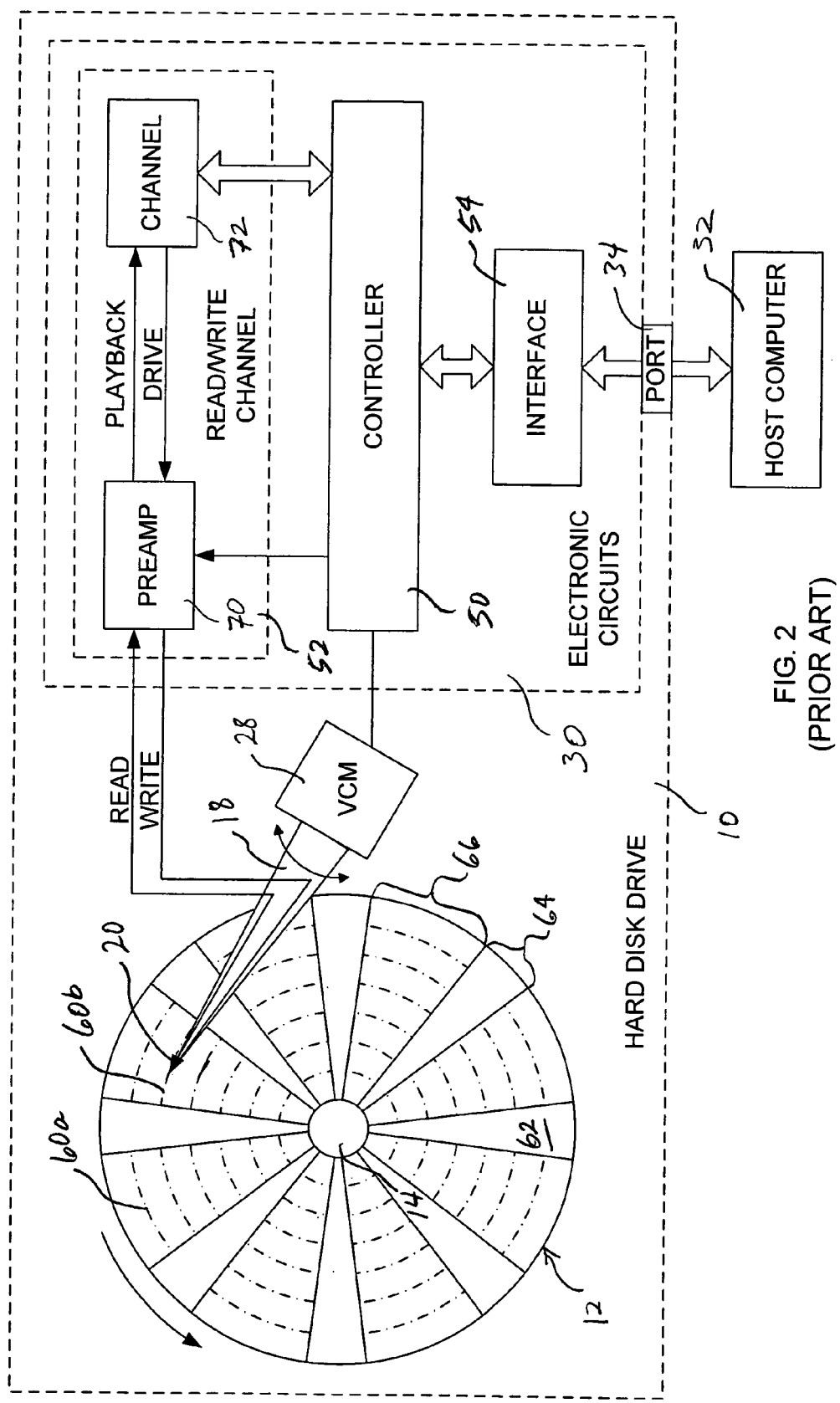
FIG. 2 is a simplified block diagram of a conventional hard disk drive system.
Figures 3, 4:
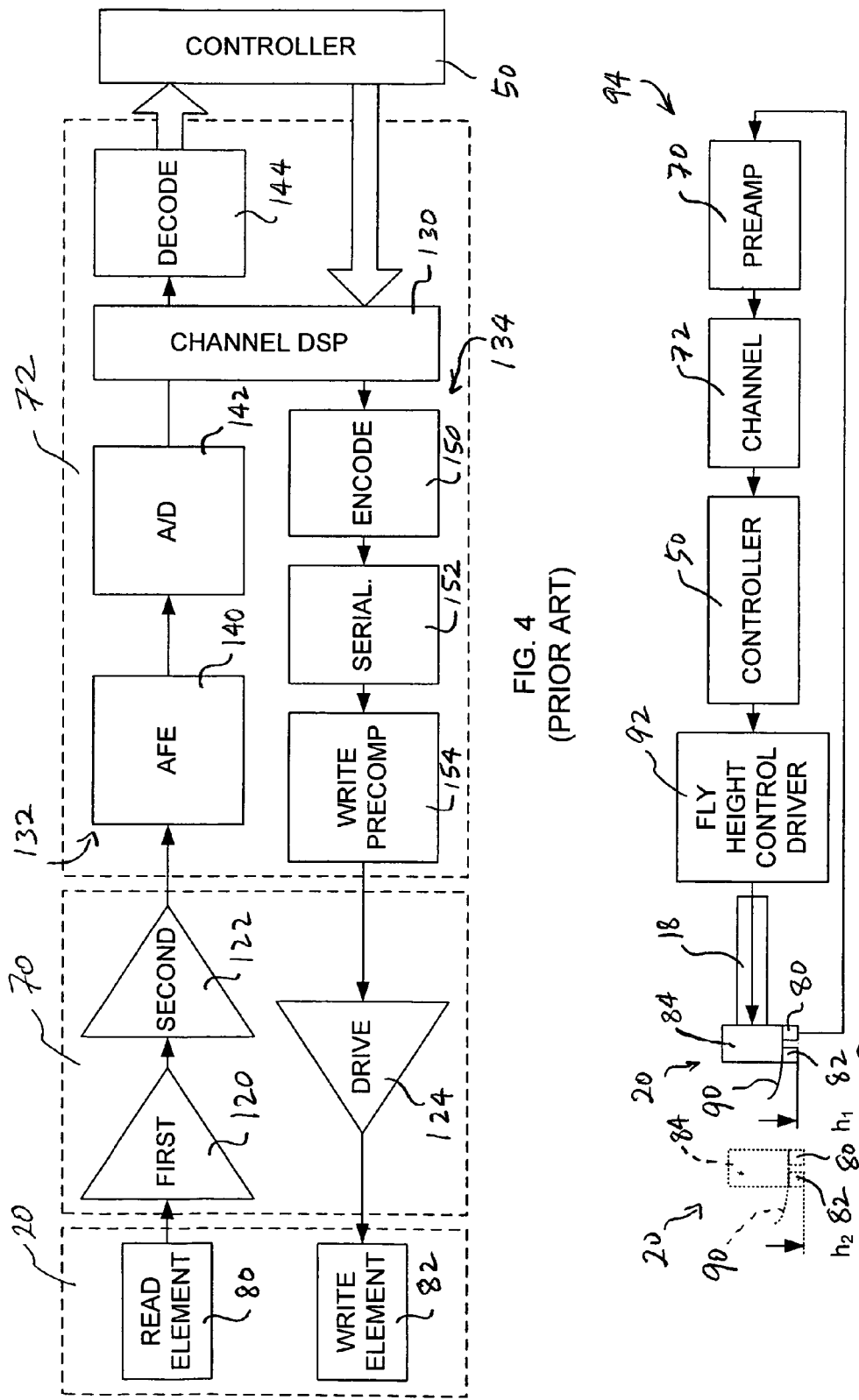
FIG. 3 is a simplified block diagram depicting fly height of a transducer relative to a disk in a conventional hard disk drive system.
FIG. 4 is a simplified block diagram depicting the components of a preamplifier circuit and read/write channel of a conventional hard disk drive system.

FIG. 5 illustrates a read/write channel 220 constructed in accordance with, and embodying the principles of, the present invention. The example read/write channel 220 comprises a preamplifier circuit 222 and channel circuit 224. As will be described in further detail below, the example read/write channel 220 may be implemented by modifying a preamplifier circuit and a read/write channel of a conventional hard disk drive such as the hard disk drive 10 depicted in FIGS. 1-4 above.

The example read/write channel 220 is typically embodied as a part of a hard disk drive system such as the hard disk drive system 10 described above. In particular, the preamplifier circuit 222 is adapted to be operatively connected in a conventional manner to the channel circuit 224 and to a transducer such as the transducer 20. The channel circuit 224 is similarly adapted to be operatively connected in a conventional manner to a controller such as the controller 50.

Components of a hard disk drive system incorporating the example read/write channel 220 that are or may be the same as the components of the disk drive system 10 described above will be identified with the reference characters used above and will not be described again beyond what is necessary for a complete understanding of the present invention.

FIG. 5 illustrates that the example preamplifier circuit 222 contains the read first stage amplifier 120, read second stage amplifier 122, and write drive amplifier 124 as described above. In addition, the preamplifier circuit 222 comprises a calibration amplifier 230 and a multiplexer 232. The example amplifiers 120, 122, 124, and 230 all are or may be differential amplifiers each having two inputs and two outputs.

FIG. 5 further illustrates that the channel circuit 224 comprises the analog front end 140, the analog to digital converter 142, the decoder 144, the encoder 150, the serializer 152, and the write precompensator 154 described above. The example channel circuit 224 further comprises a channel DSP 240 that differs from the channel DSP 130 as will be described in further detail below.

The read second stage amplifier 122 and AFE 140 will be referred to herein as the analog read components 250 of the read/write channel 220. The drive amplifier 124 will be referred to herein as the analog write component of the read/write circuit 220.

A hard disk drive containing the example calibration system operates in at least a read mode, a write mode, a fly height measurement mode, and a fly height calibration mode.

In the read mode, the read element 80 reads data from the disk 12, and the read signal generated by the read element is input to the first stage read amplifier 120 for amplification. The controller 50 generates a multiplexer control signal that controls the multiplexer 232 to pass only the output of the first stage read amplifier 120 to the second stage amplifier 122. The second stage read amplifier 122 thus generates the data playback signal based on the output of the read first stage amplifier 120. The AFE 140, A/D converter 142, channel DSP 240, and decoder 144, process the data playback signal to obtain read data. The processing of the data playback signal by the read/write channel circuit 224 is or may be conventional.

In the write mode, the controller 50 transmits write data to the channel circuit 224. The channel DSP 240, encoder 150, serializer 152, and write precompensator 154 process the write data in a conventional manner to obtain a drive signal, which is passed to the write drive amplifier 124 and the calibration amplifier 230. In this mode, the controller 50 generates the multiplexer control signal to control the multiplexer 232 to prevent the output of the calibration amplifier 230 from being transmitted to the read second stage amplifier 122. The input to the calibration amplifier 230 is thus effectively ignored. Based on the drive signal, the write drive amplifier 124 generates a write signal that controls a write element to write data to the disk 12 in a conventional manner.

As is conventional, the hard disk drive incorporating the read/write channel 220 enters the fly height measurement mode during which the current fly height value is generated. The hard disk drive may enter the fly height measurement mode periodically or when predefined conditions are satisfied. In the example read/write channel 220, the channel DSP 240 uses read compensation data as will be described in further detail below when generating the current fly height value in the fly height measure mode.

In the fly height calibration mode, the processor 50 generates the multiplexer control signal to control the multiplexer 232 to prevent the output of the first stage amplifier 120 from being transmitted to the second stage amplifier 122. Instead, the multiplexer 232 allows the output of the calibration amplifier 230 to pass to the second stage amplifier 122. In the example system 220, the channel DSP 240 also generates calibration write data when operating in the fly height calibration mode. The calibration write data is processed by the serializer 152 to obtain a calibration drive signal. The calibration drive signal is applied to the calibration amplifier 230.

Based on the calibration drive signal, the calibration amplifier 230 generates a calibration read signal that is passed through the multiplexer 232 to the read second stage amplifier 122. The read second stage amplifier 122 generates a calibration playback signal based on the calibration read signal. The calibration playback signal is then transmitted to channel circuit 224. The AFE 140 conditions the calibration playback signal, and the A/D converter 142 generates read calibration data based on the conditioned calibration playback signal.

The channel DSP 240 runs a calibration algorithm that generates the read compensation data based on the read calibration data. More specifically, the calibration algorithm generates the read compensation data to correct for characteristics, such as frequency response, of analog components of the preamplifier circuit 222 that otherwise may adversely affect the generation of the current fly height value. Then, when operating in the fly height measurement mode, the channel DSP 240 uses the read compensation data when generating the current fly height value for the purpose of altering fly height.

The example calibration amplifier 230 is configured to provide a highly stable output the characteristics of which are known. In particular, the calibration amplifier 230 is configured such that characteristics such as slew rate and gain are maintained within tightly controlled parameters over a variety of operating conditions such as temperature and the like.

In the read/write channel 220, the example calibration algorithm run by the channel DSP 240 generates calibration data in the form of a scalar value. In this example, an initial calibration value indicative of the state of the analog read components (e.g., 10) at the time the calibration process is run at the factory. When the calibration process is subsequently run, the calibration process may generate a new calibration value (e.g., 11). Until the calibration process is run again, the fly height measurement value is compensated for by multiplying the measured fly height value by a ratio of the new calibration value to the initial calibration value (e.g., 11/10). If no change has occurred, the ratio equals 1 and has no effect on the measured fly height value.

Optionally, the calibration algorithm can be configured to expect the calibration read data to be within certain predetermined parameters when operating in the calibration mode. If the calibration read data falls within these predetermined parameters, the algorithm may be configured to conclude that the read second stage amplifier and channel are calibrated. If, however, the calibration read data does not fall within these predetermined parameters, the calibration algorithm may be configured to conclude that the read second stage amplifier and channel are not calibrated and generate appropriate read compensation data. In this example, the read compensation data may take the form of a spacing offset that could be used to cancel or otherwise minimize temperature induced error in the fly height measurement signal and thus the current fly height value derived therefrom.

In another example, the calibration data may be used to reconfigure some aspect of the analog read components to calibrate the read/write channel 220.

A fly height calibration system constructed in accordance with the principles of the present invention may run continuously or enter the calibration mode periodically or when certain conditions are met. The example read/write channel 220 is configured to enter the calibration mode immediately before the current fly height value is calculated. In the example system 220, the current fly height value is measured periodically or upon the occurrence of an event such as system turn on or the like.

The calibration write data generated by the example channel DSP 240 in the fly height calibration mode is such that the calibration read signal at the input of the read second stage amplifier 122 has harmonic content at frequencies similar to those of the fly height measurement signal described above. The calibration amplifier 230 should be configured such that a magnitude of the calibration read signal is relatively large to avoid any signal-to-noise ratio problems.

In a calibration system such as the example read/write channel 220, the digital frequency sent to the preamplifier may be coupled into the signal output from the preamplifier. Such coupling may degrade the calibration accuracy. To avoid such coupling, the frequency sent to the preamplifier can be multiplied by an integer multiple such as 2 or 4. The preamp then divides this received frequency by that same factor to produce the calibration frequency. Any signal coupled over the interconnect will be well above the calibration frequency and may easily be removed by filtering.

Further, when in the calibration mode, the read/write channel 220 is configured in substantially the same manner or exactly the same as it is configured when determining the harmonic ratio of the "off disk" fly height measurement signal. The characteristics of the calibration read signal and the read/write channel 220 when the system is in the calibration mode are thus substantially the same as those when the read/write channel 220 is in the fly height measurement mode.

The multiplexer 232 allows coupling of the output of either the read first stage amplifier 120 or the calibration amplifier 230 to the read second stage amplifier 122. Given that the outputs of the read first stage amplifier 120 and the calibration amplifier 230 are analog differential signals, the example multiplexer 232 is an analog device that operatively connects both terminals of either the read first stage amplifier 120 or the calibration amplifier 230 to the read second stage amplifier 122. The multiplexer 232 may take the form of a switching device with two sets of switches that are opened and closed based on the state of the multiplexer control signal. In this case, one set of switches is opened with the other set of switches is closed, and vice versa.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

We claim:

1. A read/write channel for a hard disk drive comprising at least one analog read component and a fly height control system, where the fly height control system controls fly height based on a current fly height value generated based on a fly height measurement signal that passes through the at least one analog read component, comprising:
   a calibration signal generator for generating a calibration signal, where the calibration signal is coupled to the at least analog read component to place the read/write channel in a calibration mode; and
   a processor that generates compensation data based on an output of the at least one analog read component when the read/write channel is in the calibration mode,
   the processor generates the current fly height value based on the fly height measurement signal and the compensation data when the read/write channel is in a fly height measurement mode.

2. A read/write channel as recited in claim 1, further comprising a preamplifier circuit, where the at least one analog read component forms at least part of the preamplifier circuit.

3. A read/write channel as recited in claim 1, further comprising a channel circuit, where the at least one analog read component forms at least part of the channel circuit.

4. A read/write channel as recited in claim 1, further comprising:
   a preamplifier circuit, where the at least one analog read component forms at least part of the preamplifier circuit; and
   a channel circuit, where the at least one analog read component forms at least part of the channel circuit.

5. A read/write channel as recited in claim 1, further comprising a multiplexer operatively connected between the calibration signal generator and the at least one analog read component, where the processor further generates a multiplexer control signal for controlling the multiplexer.

6. A read/write channel as recited in claim 1, in which the calibration signal generator comprises a calibration amplifier that converts a calibration drive signal into a calibration read signal.

7. A read/write channel as recited in claim 1, in which harmonic content of the calibration signal is similar to harmonic content of the fly height measurement signal.

8. A read/write channel as recited in claim 5, in which the processor generates the multiplexer control signal to:
   connect the calibration signal to the at least one analog read component when read/write channel is in the calibration mode; and
   disconnect the calibration signal from the at least one analog read component when the read/write channel is in a read mode.

9. A read/write channel as recited in claim 5, in which the processor generates the multiplexer control signal to:
   connect the calibration signal to the at least one analog read component when read/write channel is in the calibration mode; and
   disconnect the calibration signal from the at least one analog read component when the read/write channel is in a write mode.

10. A read/write channel as recited in claim 5, in which the processor generates the multiplexer control signal to:
    connect the calibration signal to the at least one analog read component when read/write channel is in the calibration mode; and
    disconnect the calibration signal from the at least one analog read component when the read/write channel is in a write mode and in a read mode.

11. A method of generating a current fly height value for a hard disk drive comprising at least one analog read component and a fly height control system, where the fly height control system controls fly height based on the current fly height value generated based on a fly height measurement signal that passes through the at least one analog read component, comprising:
    coupling a calibration signal to the at least one analog read component in a calibration mode; and
    generating compensation data based on an output of the at least one analog read component in the calibration mode; and
    generating the current fly height value based on the fly height measurement signal and the compensation data in a fly height measurement mode.

12. A method as recited in claim 11, further comprising the steps of:
    operatively connecting a multiplexer between the calibration signal generator and the at least one analog read component; and
    generating a multiplexer control signal to control the multiplexer.

13. A method as recited in claim 11, further comprising the steps of:
    converting the calibration signal into a calibration drive signal; and
    converting the calibration drive signal into a calibration read signal.

14. A method as recited in claim 11, in which the step of coupling the calibration signal to the at least one analog read component comprises the step of generating the calibration signal such that harmonic content of the calibration signal is similar to harmonic content of the fly height measurement signal.

15. A method as recited in claim 11, further comprising the step of operating in a read mode in which the calibration signal is not coupled to the at least one analog read component.

16. A method as recited in claim 11, further comprising the step of operating in a write mode in which the calibration signal is not coupled to the at least one analog read component.

17. A read/write channel for a hard disk drive comprising a fly height control system, where the fly height control system controls fly height based on a current fly height value generated based on a fly height measurement signal, comprising:
    a channel DSP configured to generate calibration write data when the read/write channel is in a calibration mode;
    at least one write component configured to generate a calibration drive signal based on the calibration write data;
    a calibration amplifier configured to generate a calibration read signal based on the calibration drive signal, where the calibration read signal is coupled to the at least analog read component when the read/write channel is in the calibration mode,
    the channel DSP generates compensation data based on an output of the at least one analog read component when the read/write channel is in the calibration mode; and
    the channel DSP generates the current fly height value based on the fly height measurement signal and the compensation data when the read/write channel is in a fly height measurement mode.

18. A read/write channel as recited in claim 17, further comprising a preamplifier circuit, where the at least one analog read component forms at least part of the preamplifier circuit.

19. A read/write channel as recited in claim 17, further comprising a channel circuit, where the at least one analog read component forms at least part of the channel circuit.

20. A read/write channel as recited in claim 17, further comprising:
   a preamplifier circuit, where the at least one analog read component forms at least part of the preamplifier circuit; and
   a channel circuit, where the at least one analog read component forms at least part of the channel circuit.

21. A read/write channel as recited in claim 17, further comprising a multiplexer operatively connected between the calibration amplifier and the at least one analog read component, where the channel DSP further generates a multiplexer control signal for controlling the multiplexer.

22. A read/write channel as recited in claim 17, in which harmonic content of the calibration signal is similar to harmonic content of the fly height measurement signal.

23. A read/write channel as recited in claim 21, in which the channel DSP generates the multiplexer control signal to:
   connect the calibration read signal to the at least one analog read component when read/write channel is in the calibration mode; and
   disconnect the calibration read signal from the at least one analog read component when the read/write channel is in a read mode.

24. A read/write channel as recited in claim 21, in which the channel DSP generates the multiplexer control signal to:
   connect the calibration read signal to the at least one analog read component when read/write channel is in the calibration mode; and
   disconnect the calibration read signal from the at least one analog read component when the read/write channel is in a write mode.

25. A read/write channel as recited in claim 21, in which the channel DSP generates the multiplexer control signal to:
   connect the calibration read signal to the at least one analog read component when read/write channel is in the calibration mode; and
   disconnect the calibration read signal from the at least one analog read component when the read/write channel is in a write mode and in a read mode.

26. A method of calibrating a hard disk drive comprising a fly height control system, where the fly height control system controls fly height based on a current fly height value generated based on a fly height measurement signal, comprising:
   generating calibration write data in a calibration mode;
   generating a calibration drive signal based on the calibration write data;
   generating a calibration read signal based on the calibration drive signal;
   applying the calibration read signal to the at least analog read component in the calibration mode;
   generating compensation data based on an output of the at least one analog read component in the calibration mode; and
   generating the current fly height value based on the fly height measurement signal and the compensation data in a fly height measurement mode.

27. A method as recited in claim 26, further comprising the steps of:
   operatively connecting a multiplexer to prevent or allow the calibration read signal to pass to the at least one analog read component; and
   generating a multiplexer control signal for controlling the multiplexer.

28. A method as recited in claim 26, in which the step of generating the calibration write data comprises the step of generating the calibration write data such that harmonic content of the calibration read signal is similar to harmonic content of the fly height measurement signal.

29. A method as recited in claim 26, further comprising the step of operating in a read mode in which the calibration signal is not coupled to the at least one analog read component.

30. A method as recited in claim 26, further comprising the step of operating in a write mode in which the calibration signal is not coupled to the at least one analog read component.

31. A hard disk drive comprising:
   a disk;
   a transducer supported adjacent to the disk, where a spacing between the transducer and the disk defines a fly height of the transducer relative to the disk;
   a fly height control system, where the fly height control system controls fly height based on a current fly height value;
   a channel circuit comprising a channel DSP and an analog front end;
   a preamplifier circuit comprising a drive amplifier, a calibration amplifier, and at least one read amplifier, whereby
   the hard disk drive operates in a write mode in which the transducer writes data to the disk using the drive amplifier and the transducer;
   the hard disk drive operates in a read mode in which the transducer reads data from the disk using the transducer, the at least one read amplifier, and the analog front end;
   the hard disk drive operates in a calibration mode in which the channel DSP generates compensation data using the at least one read amplifier and the analog front end; and
   the hard disk drive operates in a fly height measurement mode in which the channel DSP generates the current fly height value based on the compensation data and a fly height measurement signal read from the disk using the transducer, the at least one read amplifier, and the analog front end.

32. A read/write channel as recited in claim 31, in which the channel DSP generates a calibration signal the harmonic content of which is similar to harmonic content of the fly height measurement signal.

33. A method of reading and writing data to a disk comprising the steps of:
   supporting a transducer adjacent to the disk, where a spacing between the transducer and the disk defines a fly height of the transducer relative to the disk;
   controlling the fly height based on a current fly height value;
   operating in a write mode in which the transducer writes data to the disk using a drive amplifier and the transducer;
   operating in a read mode in which the transducer reads data from the disk using the transducer, at least one read amplifier, and an analog front end;

operating the hard disk drive in a calibration mode to generate compensation data using the at least one read amplifier and the analog front end; and operating the hard disk drive in a fly height measurement mode to generate the current fly height value based on the compensation data and a fly height measurement signal read from the disk using the transducer, the at least one read amplifier, and the analog front end.

34. A method as recited in claim 33, in which the step of operating the hard disk drive in the calibration mode further comprises the step of generating a calibration signal the harmonic content of which is similar to harmonic content of the fly height measurement signal.

* * * * *